(12) United States Patent
Kudo et al.

(10) Patent No.: US 7,880,774 B2
(45) Date of Patent: Feb. 1, 2011

(54) IMAGE RECORDING APPARATUS AND METHOD

(75) Inventors: Yuma Kudo, Oume (JP); Yasuhito Ambiru, Tokorozawa (JP); Koichi Mitsuo, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1443 days.

(21) Appl. No.: 11/303,964

(22) Filed: Dec. 19, 2005

(65) Prior Publication Data

US 2006/0244769 A1 Nov. 2, 2006

(30) Foreign Application Priority Data

Apr. 28, 2005 (JP) ............................. P2005-133602

(51) Int. Cl.
H04N 5/76 (2006.01)
(52) U.S. Cl. ............................... 348/231.99; 348/231.2
(58) Field of Classification Search ................. 348/148, 348/159, 231.99, 231.1, 231.2, 231.3, 231.4, 348/231.5; 382/236, 239
See application file for complete search history.

(56) References Cited

U.S. PATENT DOCUMENTS

2002/0003575 A1* 1/2002 Marchese ................... 348/231
2004/0252207 A1* 12/2004 Yamamoto et al. .......... 348/239

FOREIGN PATENT DOCUMENTS

| JP | 10-285517 | 10/1998 |
| JP | A-10-276400 | 10/1998 |
| JP | 3346676 | 6/2002 |
| JP | 2003-111017 | 4/2003 |
| JP | 2003-143452 | 5/2003 |
| JP | 2003-219250 | 7/2003 |
| JP | 2004-159179 | 6/2004 |
| JP | 2004-260681 | 9/2004 |
| JP | 2006-115412 | 4/2006 |

OTHER PUBLICATIONS

English Abstract of JP 10-276400.
English Abstract of JP 2003-111017.
English Abstract of 2004-260681.
English Abstract of 10-285517.
English Abstract of 2003-219250.
English Abstract of 2004-159179.

(Continued)

Primary Examiner—Kelly L Jerabek
(74) Attorney, Agent, or Firm—DLA Piper LLP US

(57) ABSTRACT

An image recording apparatus and method that can store image information by thinning out latest image information at a low thinning-out ratio and thinning out old image information at a high thinning-out ratio. The image recording apparatus includes a recording unit that records plural pieces of image information received from the image pickup unit in a storage area together with recording date and time information of the respective pieces of image information; and a deleting unit that compares the present date and time and the recording date and time information recorded by the recording unit to calculate elapsed time of the respective pieces of image information and deletes the image information with the longer elapsed time at a thinning-out ratio higher than that of the image information with the shorter elapsed time.

16 Claims, 6 Drawing Sheets

OTHER PUBLICATIONS

English Abstract of 2006-115412.
English machine translation of JP 10-276400.
English machine translation of JP 3346676.
English machine translation of JP 2003-111017.
English machine translation of JP 2004-260681.
English machine translation of JP 10-285517.
English machine translation of JP 2003-219250.
English machine translationof JP 2004-159179.
English machine translation of JP 2006-115412.
Japanese Office Action issued in JP 2005-133602 on May 12, 2009.
English Language Translation of Japanese Office Action issued in JP 2005-133602 on May 12, 2009.
English Abstract for JP 2003-143452 published May 16, 2003.
English machine translation of JP 2003-143452 published May 16, 2003.

* cited by examiner

FIG. 4

IMAGE FILE NUMBER (Grid showing image file numbers 1-35 across columns and rows 1-30, with O marks indicating stored files and X marks indicating deletions)

- RECORDING AREA OF DISK (MEMORY) IS FILLED WITH PICKED-UP IMAGE INFORMATION
- SINCE IT IS IMPOSSIBLE TO DELETE THE NEXT IMAGE FILE, DELETE IMAGE FILE FROM OLDEST ONE
- SINCE IT IS IMPOSSIBLE TO DELETE THE NEXT IMAGE FILE, DELETE IMAGE FILE FROM OLDEST ONE

FIG. 5

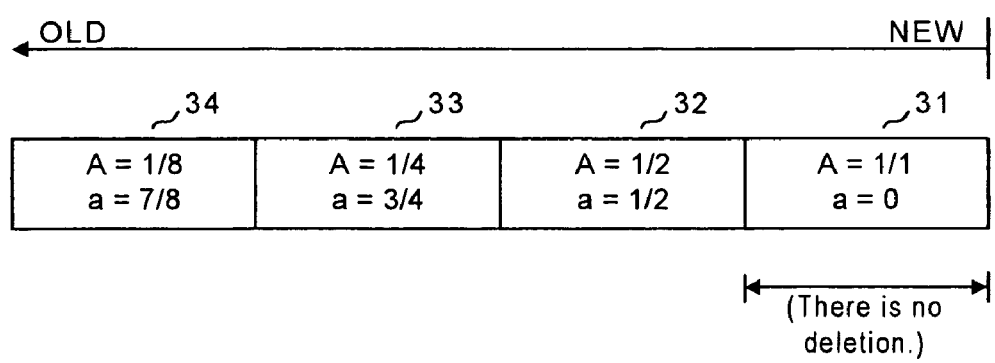

OLD ← → NEW

| 34 | 33 | 32 | 31 |
|---|---|---|---|
| A = 1/8 | A = 1/4 | A = 1/2 | A = 1/1 |
| a = 7/8 | a = 3/4 | a = 1/2 | a = 0 |

(There is no deletion.)

IMAGE RECORDING APPARATUS AND METHOD

CROSS-REFERENCE TO RELATED APPLICATIONS

This application is based upon and claims the benefit of priority from prior Japanese Patent Application No. 2005-133602, filed Apr. 28, 2005, the entire contents of which are incorporated herein by reference.

BACKGROUND OF THE INVENTION

1. Field of the Invention

The present invention relates to an image recording apparatus and method. More particularly, the invention relates to an image recording apparatus and method for performing an image information thinning-out processing corresponding to the time elapsed from the recording of an image file of a video signal.

2. Description of the Related Art

Recently, with the spread of digital apparatuses, various image information recording apparatuses such as electronic still cameras have been developed and manufactured. In such a camera, solid state image pickup elements, such as a Charge Coupled Device (CCD) array or the like are generally used. When such an image information recording apparatus is continuously used as, for example, a monitoring camera, image information stored in a memory tends to be a burden on the storage capacity.

JP-A-10-276400 discloses a technique concerning an electronic still camera. With the image recording apparatus disclosed in JP-A-10-276400, when the capacity of a recording medium is insufficient, a user selects a screen to be erased and deletes or compresses the screen. Moreover, the image recording apparatus deletes or compresses the oldest image automatically. The image recording apparatus can reduce a burden of operation for the user.

However, in the conventional technique, the user has to designate an image to be deleted. As a result, the user has to perform a complicated operation.

If images are deleted in order from an oldest image in the same way, the user does not need to perform the operation for deleting the images. However, since all old images are deleted from a memory, the user cannot see old images even if the user wishes to do so.

BRIEF SUMMARY OF THE INVENTION

An image recording apparatus of the invention includes a recording unit which records plural pieces of image information received from the image pickup unit in a storage area together with the recording date and time information of the respective pieces of image information. A deleting unit compares the present date and time and the recording date and time information recorded by the recording unit to calculate elapsed time of the respective pieces of image information and deletes some but not all of the image information with the longer elapsed time at a thinning-out ratio higher than that of the image information with the shorter elapsed time.

An image recording method of the invention includes recording plural pieces of image information are recorded in a storage area together with date and time information of the respective pieces of image information. The present date and time and the recording date and time information are compared to calculate the elapsed time of the respective pieces of image information. Some but not all of the image information with the longer elapsed time is deleted at a thinning-out ratio higher than that of the image information with the shorter elapsed time.

BRIEF DESCRIPTION OF THE SEVERAL VIEWS OF THE DRAWINGS

In the accompanying drawings:

FIG. 4 is a diagram for explaining an example of processing for deleting image information in the image recording apparatus according to one embodiment;

FIG. 5 is a diagram for explaining another example of the processing for deleting image information in the image recording apparatus according to another embodiment;

DETAILED DESCRIPTION OF SEVERAL EMBODIMENTS

An image recording apparatus according to an embodiment of the invention will be hereinafter explained in detail with reference to the accompanying drawings.

<An Example of an Image Recording Apparatus According To An Embodiment Of the Invention>

(Structure)

Figure 1:
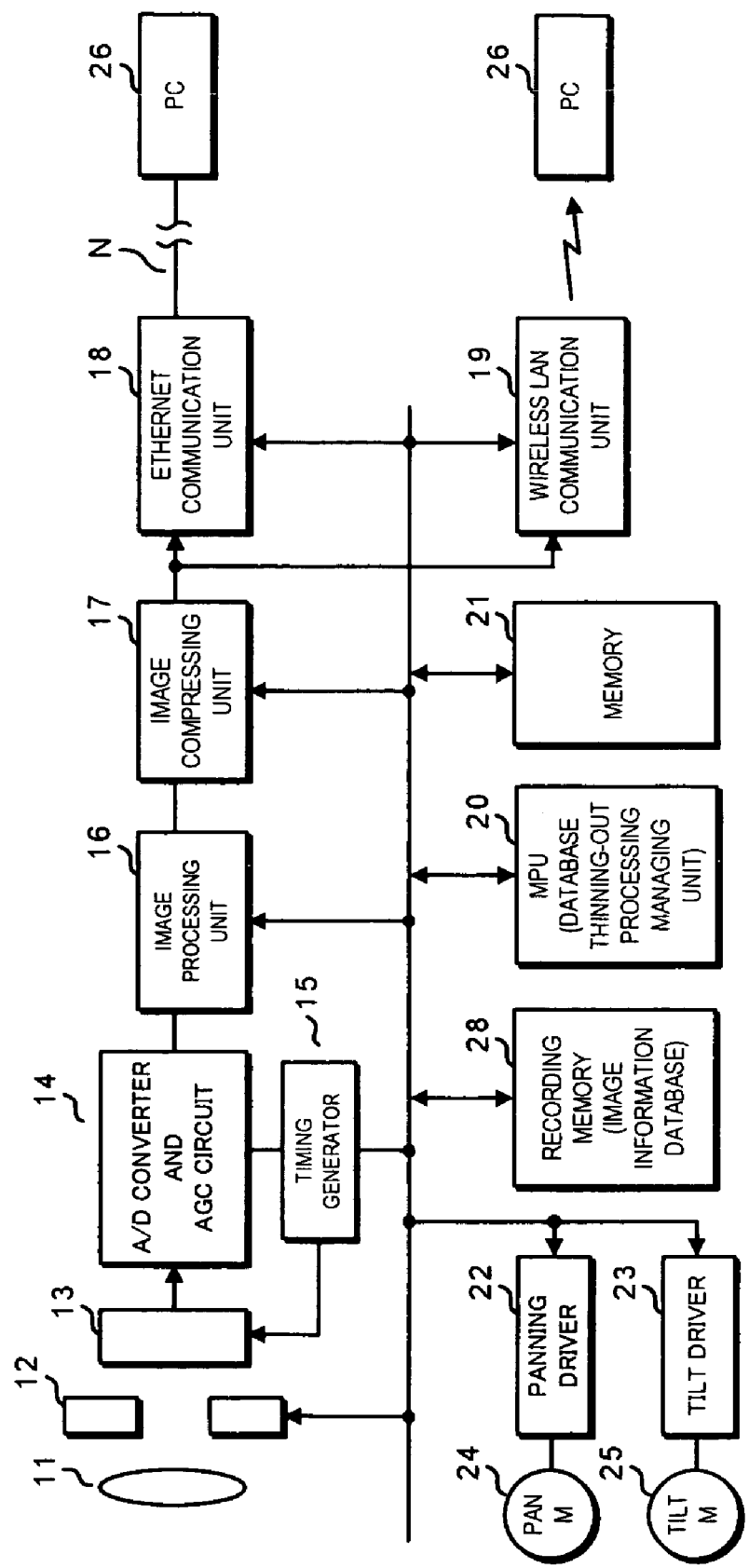
FIG. 1 is a block diagram showing an example of a structure of an image recording apparatus according to an embodiment of the invention.
Figure 2:
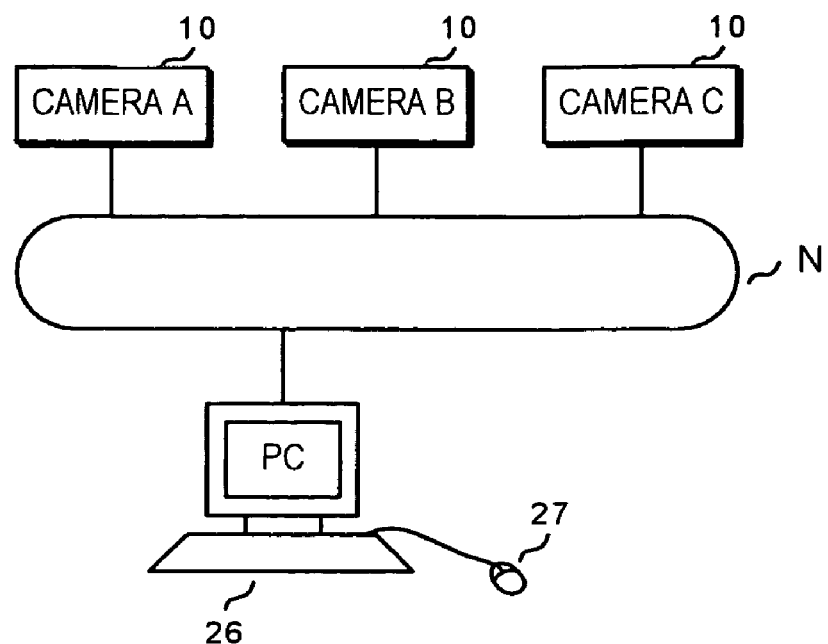
FIG. 2 is a diagram for explaining an example of a method of connecting the image recording apparatus and a network according to the embodiment.
Figure 3:
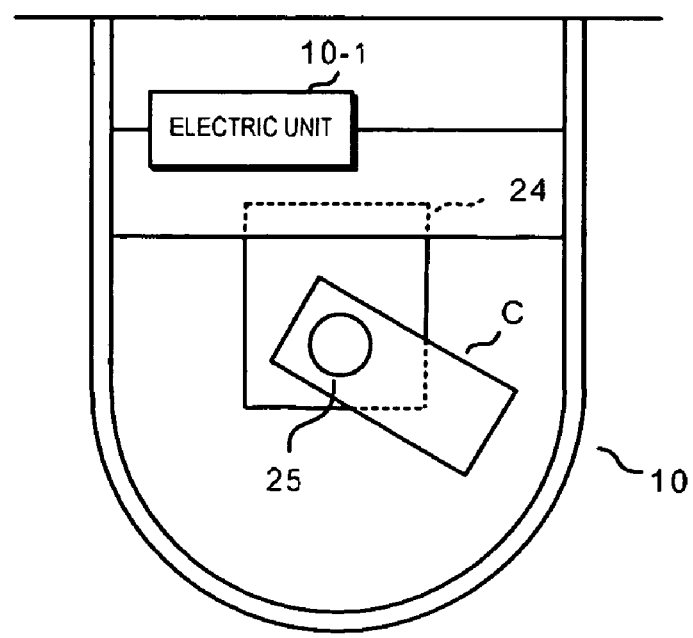
FIG. 3 is a sectional view showing an example a structure of an image pickup apparatus according to the embodiment.

FIG. 1 is a block diagram showing an example of the structure of an image recording apparatus according to one embodiment. FIG. 2 is a diagram for explaining an example of a method of connecting the image recording apparatus and a network according to the embodiment. FIG. 3 is a sectional view showing an example of a structure of an image pickup apparatus according to the embodiment.

As shown in FIG. 1, an image recording apparatus 10 according to the embodiment includes an object lens 11, a mechanical iris mechanism 12 and a solid state image pick up element 13. The iris mechanism 12 receives incident light having passed through the object lens 11, receives a control signal corresponding to a predetermined exposure value, and performs mechanical exposure correction according to the control signal. The solid state image pickup element 13 can include a Charge Coupled Device (CCD) or the like that receives the incident light subjected to the exposure correction and outputs a detection signal corresponding to the incident light.

The solid state image pickup element 13 receives a control signal, which is used for controlling the timing for generating the detection signal, from a timing generator 15 and performs photoelectric conversion processing. The solid state image pickup element 13 is also capable of performing exposure correction according to timing given by the control signal. An A/D convert and AGC (Auto Gain control) circuit 14 converts a signal detected by the solid state image pickup element 13 into a digital signal, further converts the digital signal into a digital signal of a proper value according to a control signal from the timing generator 15, and outputs the digital signal.

The image recording apparatus 10 also includes an image processing unit 16 that receives an output from the A/D convert and AGC circuit 14 and an image compressing unit 17 that applies compression processing such as MPEG compression or JPEG compression to an image signal subjected to image processing by the image processing unit 16. The image processing unit 16 applies image processing such as sharpness processing, contrast processing, gamma correction, white balance processing, and pixel addition processing to an image signal inputted to the image processing unit 16.

The image recording apparatus 10 also includes a Main Processing Unit (MPU) 20 that controls image information thinning-out processing, a memory 21 for storing programs controlling operation of the units described above and providing a work area for performing the respective kinds of processing on an image signal, and a recording memory 28 in which image information, an alarm video that is recorded at the time of movement detection or the like, a database, or the like are stored.

The image recording apparatus 10 also includes an Ethernet (registered trademark) communication unit 18 and a wireless Local Area Network (LAN) communication unit 19 that are connected to the MPU 20 via a data bus. The image recording apparatus 10 performs communication processing with PCs 26, other image recording apparatuses 10, or the like via a wire network N or a wireless network.

The image recording apparatus 10 also includes a panning driver 22 for driving a camera unit C in a panning direction, a panning motor 24 such as a stepping motor, a tilt driver 23 for driving the camera unit C in a tilt direction, and a tilt motor 25 such as a stepping motor that are connected to the MPU 20 via the data bus and controlled by the MPU 20. The camera unit C includes at least the object lens 11, the mechanical iris mechanism 12, and the solid state image pickup element 13 described above.

As shown in FIG. 2, it is possible to provide plural image recording apparatuses 10 via the network N. It is possible to drive the image recording apparatuses 10 in the panning direction and the tilt direction using the PC 26 or the like via the network N. Moreover, it is possible to perform monitoring and recording/reproduction processing for image signals of images picked up by the image recording apparatuses 10. A pointing device 27 such as a mouse is connected to the PC 26.

As shown in FIG. 3, the image recording apparatus 10 also includes the camera unit C, the panning motor 24 for driving the camera unit C in the panning direction, the tilt motor 25 for driving the camera unit C in the tilt direction, and an electric unit 10-1 having the components shown in FIG. 1 other than the camera unit C, the panning motor 24, and the tilt motor 25.

(Basic Operation)

The image recording apparatus 10 having such a structure performs a basic operation as described below. The image recording apparatus 10 can perform (a) an image pickup operation for receiving incident light from a subject and supplying an image signal through a network or the like, (b) a camera drive operation for driving the camera unit C in, for example, the panning direction and the tilt direction, (c) various setting operations for, for example, setting respective operation modes (e.g., a movement detecting operation) based on an image signal of a picked-up image and setting an exposure correcting method described later, (d) a self test operation, or the like.

In the image pickup operation, the image recording apparatus 10 receives an instruction signal from the PC 26 or the like serving as a control apparatus through the network N (or a wireless network). The image pickup operation is performed by the control of the MPU 20 according to an operation program stored in the memory 21. The solid state image pickup element 13, which has received the incident light from the subject via the object lens 11, supplies a detection signal corresponding to the incident light to the A/D convert and AGC circuit 14.

As an example, exposure correction is performed by the control of the mechanical iris mechanism 12, the solid state image pickup element 13, and the AGC circuit 14. In other words, the mechanical iris mechanism 12 receives an exposure control signal from the MPU 20 and controls an amount of light introduced into the solid state image pickup element 13 according to this exposure control signal to thereby perform desired exposure correction. As an electronic shutter function, the solid state image pickup element 13 corrects shutter speed. The timing generator 15 receives an exposure control signal from the MPU 20 and supplies a timing signal corresponding to this exposure control signal to the solid state image pickup element 13. The solid state image pickup element 13 picks up an image of incident light according to the timing signal and adjusts shutter speed by converting the incident light into an electric signal to thereby perform the exposure correction.

A control signal is supplied to the A/D convert and AGC circuit 14 from the timing generator 15 that receives the exposure control signal from the MPU 20. The A/D convert and AGC circuit 14 controls a gain of a detection signal supplied from the solid state image pickup element 13 according to the control signal to thereby perform the exposure correction. The three stages of exposure correction is described here as an example. However, it is also possible to perform the exposure correction in any one of the stages. Moreover, it is also possible to perform the exposure correction according to pixel addition processing or the like of the image processing unit 16.

In the camera drive operation, after zero coordinate adjustment performed in the panning motor 24 and the tilt motor 25 serving as stepping motors, the MPU 20 manages present coordinates of a screen, on which the camera unit C is picking up an image, and always recognizes the coordinates. The camera unit C is driven in the panning direction or the tilt direction according to an operation control signal supplied to the panning driver 22 or the tilt driver 23 from the MPU 20 to change the pickup image. At this point, the MPU 20 always recognizes present coordinates of an image on which the camera 1 unit C directed. Therefore, a user can move the camera unit C in the panning direction or the tilt direction while looking at a present image pickup screen, which corresponds to image signals continuously supplied by the image recording apparatus 10, on a screen of the PC 26 or the like connected through the network. The user can also look at an image pickup screen and acquire present coordinate information of the image pickup screen on, for example, the PC 26.

In a recording operation mode, the image recording apparatus 10 records data, which is subjected to image compression such as JPEG compression or MPEG compression by the image compressing unit 17, in the recording memory 28 for an arbitrary number of images or during an arbitrary period of time set by the user.

In the movement detecting operation mode, the image recording apparatus 10 automatically detects movement of an image in an arbitrary area set by the user. An observation area for movement detection is set according to operation of the user in a setting screen for the movement detecting operation mode. Thereafter, when the image recording apparatus 10 detects a change of an image equal to or larger than a predetermined value in this observation area during a period set by the user, the MPU 20 judges that movement is detected and, for example, sequentially stores image information in this period in the recording memory 28 as alarm videos.

<Image Information Thinning-Out processing in the Image Recording Apparatus According To Several Embodiments of the Invention>

Figure 6:
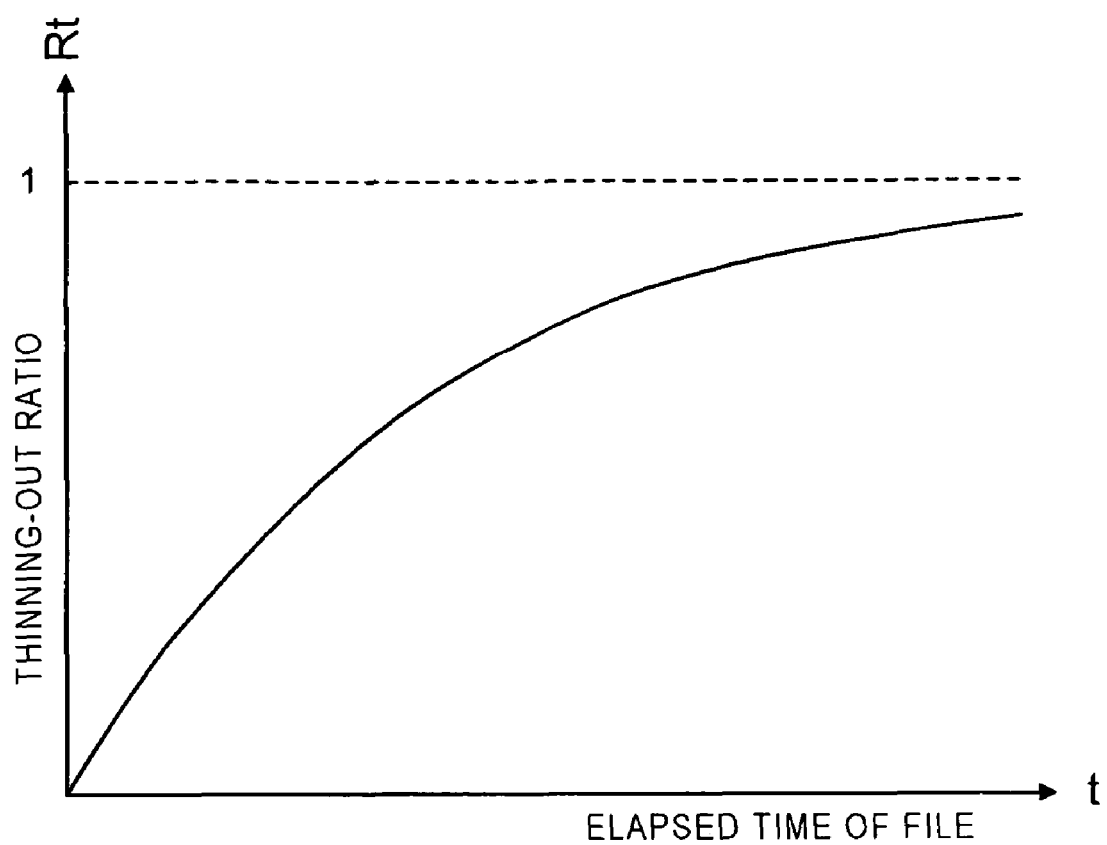
FIG. 6 is a graph showing an example of a relation between elapsed time and a thinning-out ratio of image information in the image recording apparatus according to another embodiment.
Figure 7:
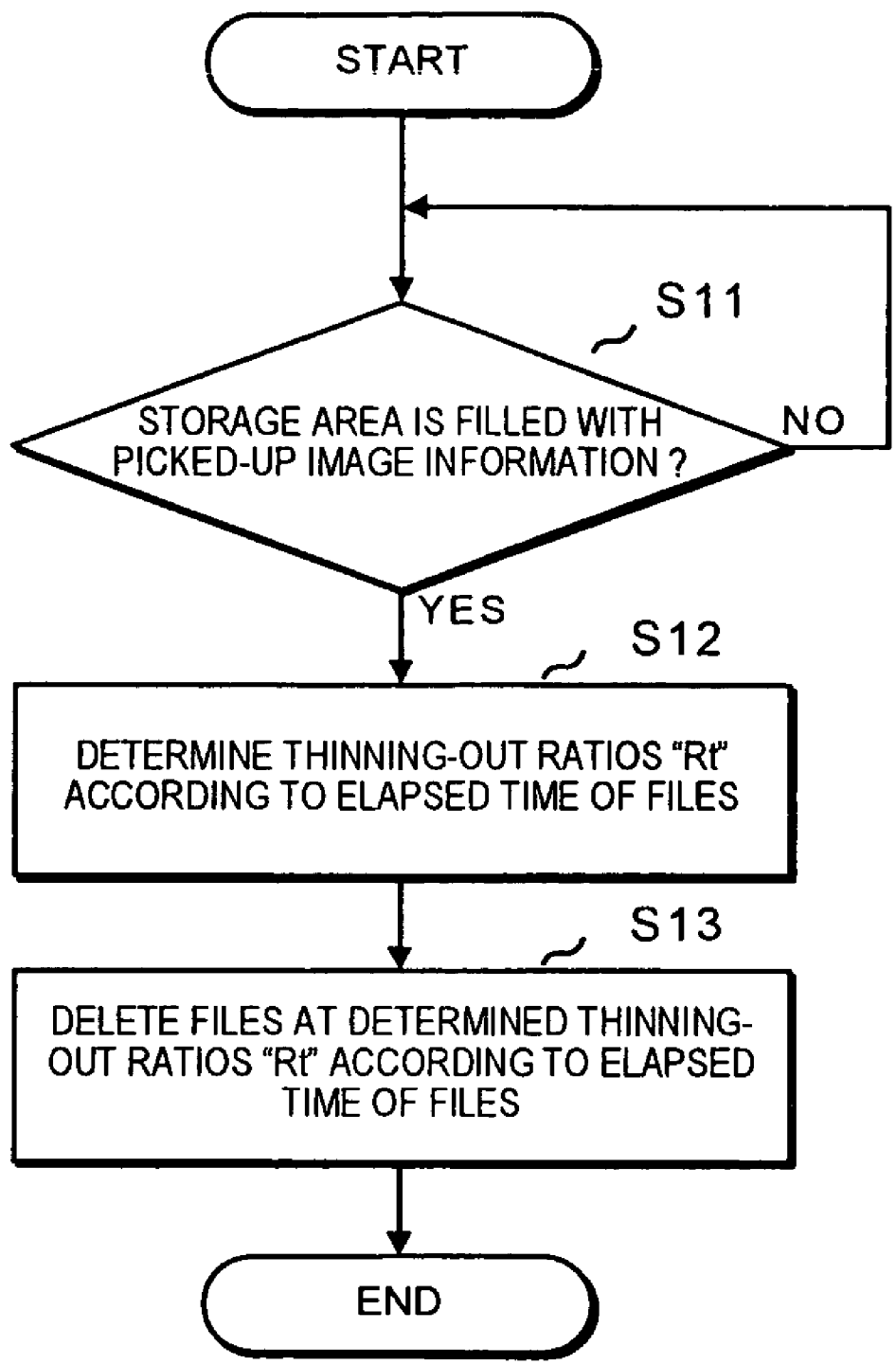
FIG. 7 is a flowchart showing an example of image information thinning-out processing in the image recording apparatus according to one embodiment.
Figure 8:
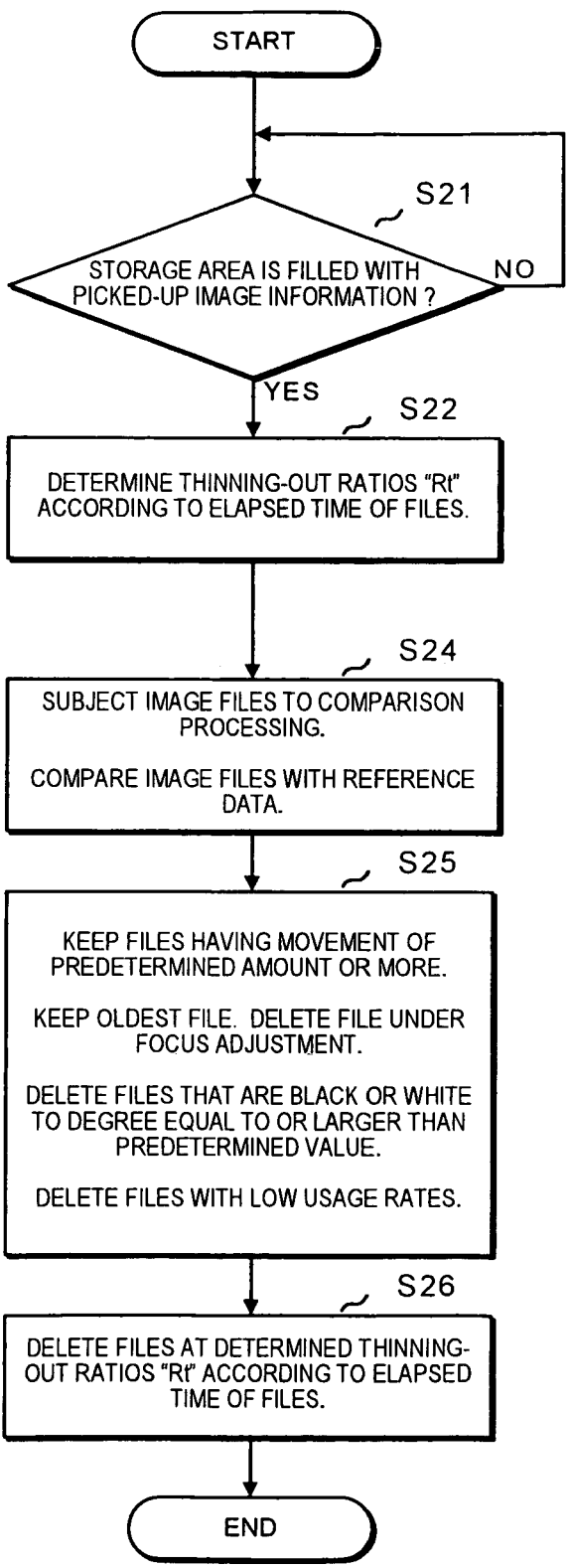
FIG. 8 is a flowchart showing another example of image information thinning-out processing in the image recording apparatus according to another embodiment.

Next, image information thinning-out processing in the image recording apparatus will be explained in detail with reference to the drawings. FIG. 4 is a diagram for explaining an example of processing for deleting image information in the image recording apparatus according to one embodiment. FIG. 5 is a diagram for explaining another example of the processing for deleting image information in the image recording apparatus according to another embodiment. FIG. 6 is a graph showing an example of a relation between elapsed time and a thinning-out ratio of image information in the image recording apparatus according to another embodiment. FIG. 7 is a flowchart showing an example of image information thinning-out processing in the image recording apparatus according to an embodiment. FIG. 8 is a flowchart showing another example of the image information thinning-out processing in the image recording apparatus according to another embodiment.

(An Example Of Thinning-Out Processing)

First, one specific image information thinning-out process in the image recording apparatus will be explained with reference to FIG. 4. In the example shown in FIG. 4, the recording memory 28 of the image recording apparatus 10 sequentially records image files 1 to 27. As an example, it is assumed that image files for only ten hours can be stored in a storing area of the recording memory 28 serving as a recording medium. Note that the number of images to be recorded in one hour may be an arbitrary number as long as the number is an integer.

Image file numbers in a horizontal direction in the table in FIG. 4 are reference numbers that are attached to respective pieces of image information for one hour acquired by the image recording apparatus 10. Time in a vertical direction means hours elapsed from start of image pickup. In this example, image files of a first hour to a twenty-seventh hour are shown after being subjected to thinning-out processing appropriately.

In the conventional method of sequentially deleting oldest image files sequentially, oldest files are deleted after eleven hours. Therefore, in the twenty-seventh hour, image files from the eighteenth hour to the twenty-seventh hour remain. With this method, it is possible to learn about image files for the closest ten hours in detail but it is impossible to learn about image files before that.

Thus, in this embodiment, image information thinning-out processing is performed on the basis of three rules described below.

First rule: In deleting image information, keep three pieces of image information recorded most recently.

Second rule: Delete the second image information left in memory recorded after the image information deleted most recently.

Third rule: When the first rule for deleting image information cannot be observed when attempting to delete image information in accordance with the second rule, delete the oldest image information neglecting the second rule.

The image information thinning-out processing in FIG. 4 is performed in accordance with the three rules described above.

In the table in FIG. 4, image files from the "first" hour to the "tenth" hour are not deleted while the memory is not full.

Concerning an eleventh row, the recording area of the disk (the memory) is filled with image information and an image file with the number 1 is deleted in accordance with the third rule.

Concerning a twelfth row, in accordance with the first rule and the second rule, "the second image information recorded after the image information deleted most recently (the image file with the number 1)", that is, an image file with the number 3 is deleted.

Concerning a thirteenth row, in accordance with the first rule and the second rule, "the second image information recorded after the image information deleted most recently (the image file with the number 3)", that is, an image file with the number 5 is deleted.

Such processing is repeated up to an eighteenth row.

Concerning a nineteenth row, if it is attempted to observe the second rule, since the second image information recorded after the image information deleted most recently (an image file with the number 15), that is, an image file with the number 17 falls the under the first rule "keep three pieces of image information recorded most recently" (image files with the numbers 16 to 18), the second rule cannot be observed. Therefore, "when the first rule for deleting image information cannot be observed if it is attempted to delete image information, delete the oldest image information (the image file with the number 2) neglecting the second rule".

Concerning twentieth to twenty-sixth rows, again, in accordance with the first and the second rules, pertinent image files are deleted. At a twenty-seventh row, again, since the first rule cannot be observed, the image file with the number 4 is deleted in accordance with the third rule.

Note that the image information thinning-out method described above falls under a basic idea according to the embodiment "when information is recorded exceeding a predetermined storage capacity of a storage area, image information with longer elapsed time is deleted at a thinning-out ratio higher than that of image information with shorter elapsed time".

In the case described above, although an "image information thinning-out ratio" is not applied to elapsed time accurately, there is a consistent tendency that image information with longer elapsed time is deleted more than image information with shorter elapsed time.

Moreover, as explained below, there are examples of the image information thinning-out processing other than the above.

(An Example of General Image Information Thinning-Out Processing)

An example of general image information thinning-out processing will be explained with reference to the drawings.

FIG. 7 is a flowchart for explaining an outline of the image information thinning-out processing of the picked-up image recording apparatus. In FIG. 7, a control unit 20 such as the MPU 20 shown in FIG. 1 recognizes that, for example, the storage area of the recording memory 28 or the like is filled with image information (or filled at a predetermined value such as 95% given in advance) (STEP 11). Then, the control unit 20 classifies a large number of image files or the like currently stored in the recording memory 28 or the like into four stages as shown in FIG. 5 according to, for example, elapsed time obtained by comparing the present date and time and a recording date and time. The control unit 20 determines image information thinning-out ratios "a" for the respective stages (STEP 12).

As shown in FIG. 5, residual ratios A corresponding to the thinning-out ratios "a" are given to respective areas 31, 32, 33, and 34 according to a thinning-out processing function of the MPU 20. The thinning-out ratio "a" and the residual ratio for the area 31 are determined as 0 and 1, the thinning-out ratio "a" and the residual ratio for the area 32 are determined as 1/2 and 1/2, the thinning-out ratio "a" and the residual ratio for the area 33 are determined as 3/4 and 1/4, and the thinning-out ratio "a" and the residual ratio for the area 34 are determined as 7/8 and 1/8 (STEP 12).

Images files in the respective areas 31, 32, 33, and 34 are deleted according to the values of the thinning-out ratios "a", whereby old files are subjected to the thinning-out processing at high thinning-out ratios and new files are subjected to the thinning-out processing at low thinning-out ratios (STEP 13). Note that the problem is in which order, for example, thinning-out with the thinning-out ratio 3/4 is realized for plural image files in the respective areas. In this case, it is desirable to give regularity to the image files. For example, serial numbers of the image files are simply divided by, for example, an integer "4", and image files with numbers other than those divisible by "4" are thinned out. However, other methods are also possible.

Alternatively, the thinning-out ratio can vary over time as illustrated in FIG. 6.

The examples in FIGS. 5 to 7 are only several embodiments of the invention. It is needless to mention that it is possible to perform image information thinning-out processing with different thinning-out ratios corresponding to elapsed time of image files according to other various methods.

As explained above, according to the invention, rather than simply deleting, for example, at a timing when a memory capacity is filled with image information, images in order from an oldest image as in the conventional apparatus, at least thinning-out ratios of old images are set higher than thinning-out ratios of new images to delete entire image information. Consequently, not all old images are deleted. That is some old images are deleted while others of the old images are kept. This makes it possible for a user to see old images according to circumstances in the future and makes it possible to realize both saving of a storage capacity and convenience of use of image information.

If the method of deleting old images automatically deletes plural old images while keeping only representative images, it is possible to keep representative old images while securing a capacity of a memory or the like incorporated in an image recording apparatus such as a monitoring camera. Thus, it is possible to recognize states in the past from the representative image information.

(An Example of Another Effective Thinning-Out Processing)

More effective thinning-out processing for image information is possible according to processing shown in a flowchart in FIG. 8. The control unit 20 such as the MPU 20 shown in FIG. 1 recognizes that, for example, the storage area of the recording memory 28 or the like is filled with image information (filled at a predetermined value such as 95% given in advance) (STEP 21). Then, the control unit 20 classifies a large number of image files or the like currently stored in the recording memory 28 or the like into plural stages as shown in FIG. 5 according to, for example, elapsed time obtained by comparing the present date and time and a recording date and time. The control unit 20 determines image information thinning-out ratios "a" for the respective stages (STEP 22).

Next, the control unit 20 compares image files in an area to derive a comparison result according to a function of a thinning-out processing managing unit of the MPU 20 (STEP 23). Specifically, the control unit 20 measures an amount of change in image concentrations of image files adjacent to each other, movement of image concentration distributions in respective coordinates, or the like. This is because, if the movement or the amount of change of an image file is large, this means that the image file has an intense change of images and, in the case of video information of a monitoring camera, it can be said that the image file is a image file highly valuable for a user to refer to in which a target is shown.

Processing described below is made effective according to a result of such comparison processing (STEP 24). It is preferable to keep an oldest image. It is also preferable to judge whether an image is extremely black (has an extremely high concentration) or extremely white (has an extremely low concentration) by comparing an image file with a reference data. This is because it is highly likely that a black image is an image of the dark in which nothing is shown and a white is an image in which subjects desired by a user are not shown at all. It is preferable to set the extremely black image and the extremely white image as objects of thinning-out processing. Moreover, it can be said that an image under focus adjustment is an image with a low value that should be set as an object of thinning-out processing.

At the time of panning or tilt movement, if shutter speed is low compared with panning or tilt movement speed, an image picked up at such shutter speed is not worth using. Thus, it is preferable to set the image as an object of thinning-out processing. Moreover, it is highly likely that an image with a high usage rate, which has a history of use on the basis of a history referred to in the past, is referred to again. Thus, it is effective to judge that the image is not set as an object of thinning-out processing.

After deleting all the image files that are considered to be unnecessary, the control unit 20 subjects the images files in the respective areas to the thinning-out processing in order to realize the thinning-out ratios "a" determined earlier (STEP 25).

In this way, according to the image recording apparatus and the image recording method according to the embodiment, it is effective for saving of a storage capacity and utilization of measured image information with a high added value to subject image files in corresponding areas to the thinning-out processing on the basis of a fixed standard according to determined thinning-out ratios.

As a modification of the embodiment, it is not always necessary to start the thinning-out processing described above after the percentage of storage capacity used reaches a predetermined amount. For example, it is also effective to uniformly perform thinning-out processing on all pieces of image information picked up the day before (image information for which predetermined time has elapsed after image pickup). In this case, for example, if the time that image information has been stored exceeds a fixed value, it is preferable to apply the various kinds of processing for saving image information even if the memory is not filled with image information.

As in the embodiment described above, it is extremely effective for saving processing for a storage capacity to adopt a method of subjecting, without always associating image files with recorded elapsed time, all the image files to thinning-out processing uniformly according to a saving mode (a thinning-out mode) under fixed conditions and recording the image files in a recording memory of a image recording apparatus while performing the saving processing.

This is a method of deleting picked-up image information, which falls under one of the following conditions (a) to (d), uniformly regardless of whether the picked-up image information is new picked-up image information or old picked-up image information: (a) extremely white or black picked-up image information; (b) continuous picked-up image information without movement; (c) picked-up image information picked up at the time of focus adjustment; and (d) picked-up image information that is picked up during panning movement or tilt movement when the moving speed is higher (or relatively higher) than the shutter speed (or higher than a predetermined value).

According to such a method, it is possible to use a fixed capacity of a storing memory as effectively as possible. A user does not need a special operation for saving of a storage capacity and can establish an image database with an extremely high added value. This makes it possible to record and utilize long-time image information.

Lastly, in specifications of the image information thinning-out processing, it is effective to combine and set the respective options described above according to a state of use of the image recording apparatus. It is preferable to give the options according to setting processing applied to the MPU 20 in response to operation of the picked-up image recording apparatus by the user. Consequently, the user can perform appropriate image information thinning-out processing according to an application of the picked-up image recording apparatus.

According to the invention, it is possible to provide an image recording apparatus and method that can save storage capacity of a recording medium, while still maintaining the ease of using picked-up image information.

Various modifications of the embodiments described above will easily occur to those skilled in the art. It is possible to apply the invention to various embodiments without any inventive ability. Therefore, the invention covers a wide-range and is not limited to the embodiments described above.

What we claim is:

1. An image recording apparatus comprising:
    a recording unit that records plural pieces of image information in a storage area together with recording date and time information of the respective pieces of image information; and
    a control unit that compares the present date and time and the recording date and time information recorded by the recording unit to calculate elapsed time of the respective pieces of image information and deletes some but not all image information with the longer elapsed time at a thinning-out ratio higher than that of the image information with the shorter elapsed time;
    wherein, in deleting the image information for making free space in the storage area to record next image in the storage area, the control unit deletes the plural pieces of image information recorded by the recording unit in accordance with a first rule of keeping n pieces of image information recorded most recently, a second rule of deleting the $m^{th}$ image information still recorded after image information deleted most recently, and a third rule of deleting the oldest image information neglecting the second rule when the first rule cannot be observed if it is attempted to delete the image information in accordance with the second rule.

2. An image recording apparatus according to claim 1, wherein the control unit preliminary deletes the image information according to a result obtained by comparing the plural pieces of image information recorded by the recording unit to one another.

3. An image recording apparatus according to claim 1, wherein, when the deleting unit compares the image information recorded by the recording unit with image information before and after the image information, if the image information shows an amount of change equal to or larger than a predetermined value, the control unit keeps the image information preferentially.

4. An image recording apparatus according to claim 1, wherein, when the image information recorded by the recording unit is image information obtained during focus adjustment, the control unit deletes the image information preferentially.

5. An image recording apparatus according to claim 1, wherein, when shutter speed of the image pickup unit is equal to or lower than a fixed speed, the control unit deletes image information, which is picked up during palming movement or tilt movement of the image pickup unit, preferentially.

6. An image recording apparatus according to claim 1, wherein, when the image information recorded by the recording unit is black to a degree equal to or larger than a first predetermined value or white to a degree equal to or larger than a second predetermined value, the control unit deletes the image information preferentially.

7. An image recording apparatus according to claim 1, wherein, among the image information recorded by the recording unit, the control unit deletes image information with a low usage rate more preferentially than image information with high usage ratio.

8. An image recording apparatus according to claim 1 further comprising an image pickup unit that picks up an image and outputs the image information.

9. An image recording method, comprising:
    recording plural pieces of image information in a storage area together with recording date and time information of the respective pieces of image information; and
    comparing the present date and time and the recording date and time information to calculate elapsed time of the respective pieces of image information and deleting some but not all image information with the longer elapsed time at a thinning-out ratio higher than that of the image information with the shorter elapsed time;
    wherein, in the deleting of the image information for making free space in the storage area to record next image in the storage area, deleting the plural pieces of image information in accordance with a first rule of keeping n pieces of image information recorded most recently, a second rule of deleting the $m^{th}$ image information still recorded after image information deleted most recently, and a third rule of deleting oldest image information neglecting the second rule when the first rule cannot be observed if it is attempted to delete the image information according to the second rule.

10. An image recording method according to claim 9, wherein, in the deleting of the image information, preliminarily determining whether the image information should be deleted according to a result obtained by comparing the plural pieces of image information to one another.

11. An image recording method according to claim 9, wherein, in the deleting of the image information, preliminarily comparing the image information with image information before and after the image information, and if the image information shows an amount of change equal to or larger than a predetermined value, keeping the image information preferentially.

12. An image recording method according to claim 9, wherein, in the deleting of the image information, when the image information is image information obtained during focus adjustment, deleting the image information preferentially.

13. An image recording method according to claim 9, wherein, in the deleting of the image information, when shutter speed at the image pickup time is equal to or lower than a fixed speed, deleting image information, which is picked up during panning movement or tilt movement of an image pickup unit, preferentially.

14. An image recording method according to claim 9, wherein, in the deleting of the image information, when the image information is black to a degree equal to or larger than a first predetermined value or white to a degree equal to or larger than a second predetermined value, deleting the image information preferentially.

15. An image recording method according to claim 9, wherein, in the deleting of the image information, among the image information, deleting image information with a low usage rate more preferentially than image information with high usage ratio.

16. An image recording method according to claim 9, further comprising picking up an image and outputting the image information.

* * * * *